United States Patent [19]

Hahn

[11] Patent Number: 4,577,407
[45] Date of Patent: Mar. 25, 1986

[54] DEHORNER

[75] Inventor: A. David Hahn, Middletown, Conn.

[73] Assignee: Jarvis Products Corporation, Middletown, Conn.

[21] Appl. No.: 624,297

[22] Filed: Jun. 25, 1984

[51] Int. Cl.⁴ ............................................. B26B 17/00
[52] U.S. Cl. ..................................... 30/180; 17/1 R; 30/182
[58] Field of Search .................. 30/180, 182, 228, 183, 30/184, 185, 210, 241; 17/1 R

[56] References Cited

U.S. PATENT DOCUMENTS

| | | | |
|---|---|---|---|
| 582,932 | 5/1897 | Kohl | 30/183 |
| 980,725 | 1/1911 | Windus | 30/185 |
| 2,257,245 | 9/1941 | Rudolph | 30/228 |
| 2,624,112 | 1/1953 | Lavarevich | 30/182 |
| 3,562,906 | 2/1971 | Edwards | 30/180 |
| 3,670,411 | 6/1972 | Peters | 30/228 X |
| 4,345,377 | 8/1982 | Hewes | 30/192 |
| 4,442,602 | 4/1984 | Byrne | 30/180 |

Primary Examiner—Jimmy C. Peters
Attorney, Agent, or Firm—DeLio & Associates

[57] ABSTRACT

The invention is a dehorner for removing horns from the skulls of cattle or the like comprising a frame with a cutting side defining a plane and an operator side and having a fixed blade and a reciprocating blade which is projected toward the fixed blade during dehorning, both blades containing base portions which are contained within the plane of the frame and riser portions which extend outward from the plane of the frame on the cutting side so that the blades cut behind the base of the horn into the softer portion of the skull and remove all of the horn from the skull of the cattle.

7 Claims, 7 Drawing Figures

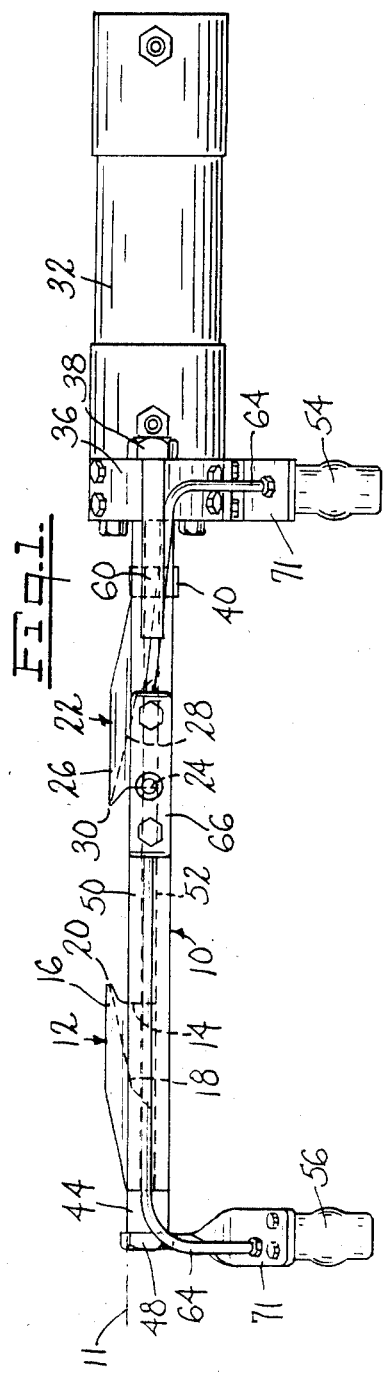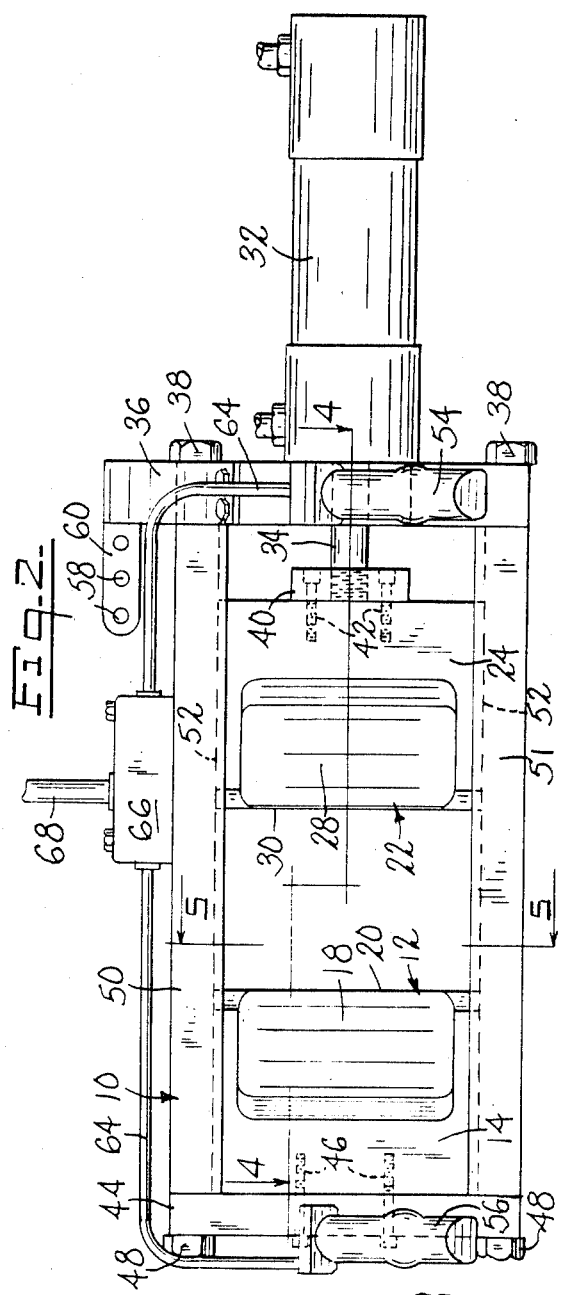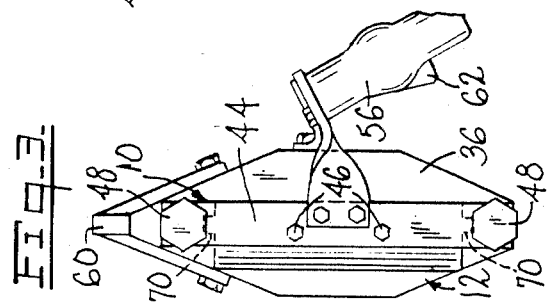

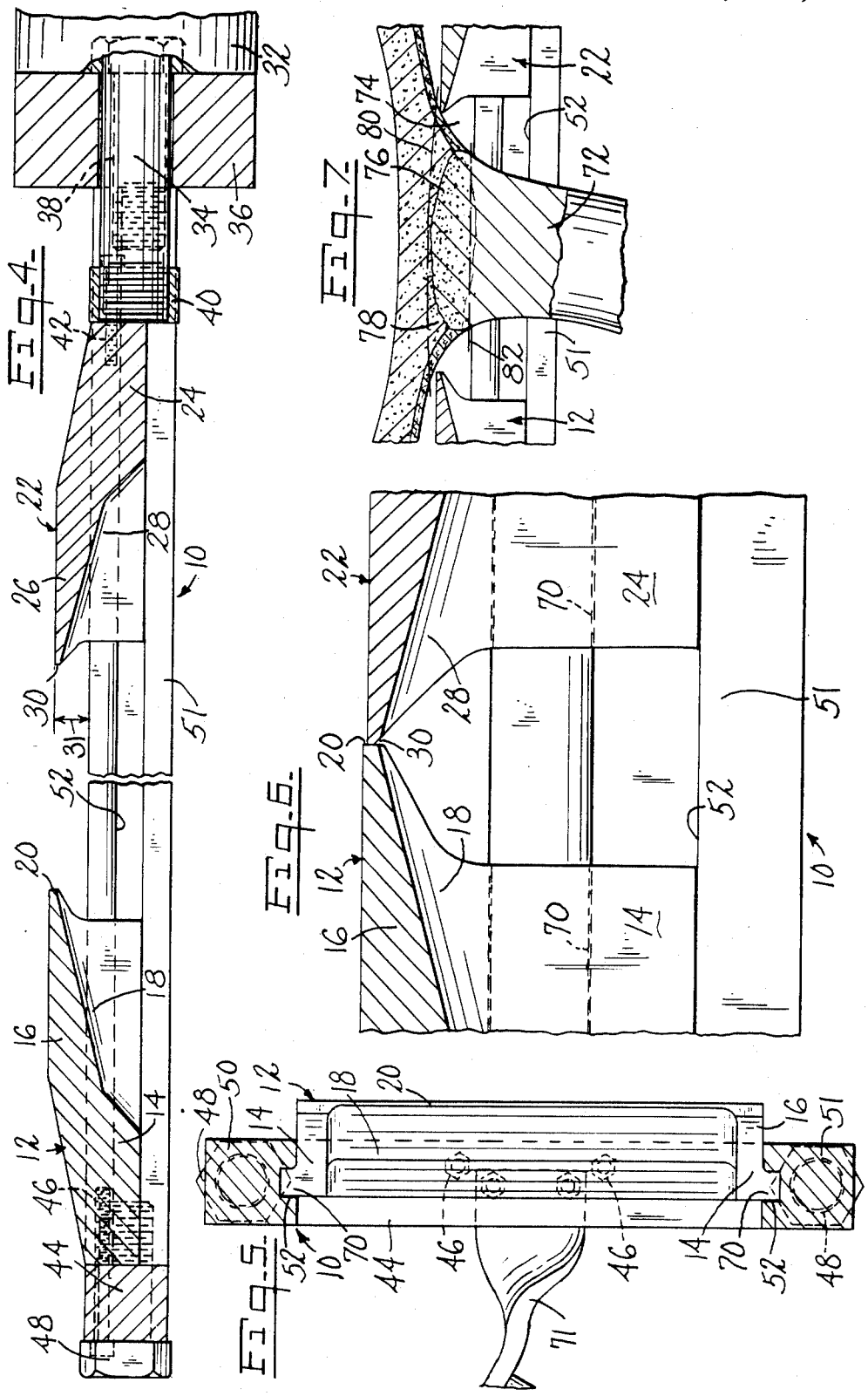

DEHORNER

BACKGROUND OF THE INVENTION

The invention is directed to dehorners, i.e., devices for removing horns from cattle in slaughtering operations and more particularly a new and improved arrangement for the fixed blade and reciprocating blade of the dehorner.

Hydraulic, motor operated dehorners are known in the present state of the art and are shown for example, in the dehorning device of Rudolph, U.S. Pat. No. 2,257,245. The blades of Rudolph, one of which is a fixed blade and one of which is a reciprocating blade, are contained within a frame. The reciprocating blade is operated to slide towards the fixed blade and overlap it so as to cut the horn from the skull of the animal in a guillotine-like fashion. Rudolph also teaches a particular hydraulic piston arrangement for operation of the reciprocating blade which, after the cutting stroke, is moved away from the fixed blade to an open position. Devices as shown in the Rudolph patent remove only that portion of the horn which extends outwardly from the skull and are not able to remove the nub or base portion of the horn which is embedded within the skull bone. In order to comply with USDA requirements, all of the horn, including the nub, must be removed before opening the head cavity. The devices of the prior art remove only a portion of the horn, leaving the nub embedded in the skull, and because they cut directly through the horn itself, which is harder than the skull, the cutting is very difficult to effect and the blades sustain substantial wear and tear. The subject invention is directed to a new and improved dehorner which solves the problems of the prior art devices by cutting behind the horn and into the softer part of the skull thereby enabling removal of the nub of the horn. This is accomplished by cutting into the softer skull bone beneath the nub which may be accomplished by utilizing the newer blade structure of the instant invention.

SUMMARY OF THE INVENTION

The invention provides a dehorner comprising a frame having a cutting side defining a plane and an opposite, operator side, a pair of opposed blades mounted in the frame and having respective cutting edges. Motive means are responsive to actuating means to operate at least one of the blades to provide relative movement of the cutting edges between an open position and a closed, cutting position. Each blade has a base portion mounted within the frame and a riser portion extending outwardly of the cutting side of the frame and terminating in its respective cutting edge, whereby the cutting path defined by movement of the cutting edge of at least one of the blades is disposed outwardly of the plane defined by the cutting side of the frame.

In one embodiment of the invention, one of the opposed blades is a fixed blade and the other opposed blade is a reciprocating blade which is operatively connected to the motive means for selective movement (in response to the actuating means) towards the fixed blade to the closed, cutting position and away from the fixed blade to the open position. The riser portions of the blades may contain recesses terminating in cutting edges. The cutting edge of the fixed blade may be of greater width than the cutting edge of the reciprocating blade whereby the cutting edge of the fixed blade serves as a stop for the reciprocating blade. The motive means may comprise a hydraulic actuated cylinder operatively connected to the reciprocating blade. The actuating means includes, in one aspect of the invention, right hand and left hand actuating means mounted on the dehorner and operatively connected to the motive means to actuate driving of the blades from their open position to their closed, cutting position when both the right hand and left hand actuating means are placed in actuating position, and to open the blades to their open position when either of the right hand or left hand actuating means is not in its actuating position. The actuating means may comprise finger operated trigger switches.

The invention accordingly comprises the features of construction combination of elements and arrangement of parts which will be exemplefied in the construction hereinafter set forth and the scope of the invention will be indicated in the claims.

BRIEF DESCRIPTION OF THE DRAWINGS

For a fuller understanding of the invention, reference is had to the following description taken in connection with the accompanying drawings in which:

FIG. 1 is a top plan view of a dehorner comprising an embodiment of the invention;

FIG. 2 is an elevational view of the operator side of the dehorner of FIG. 1;

FIG. 3 is an end elevational view of the dehorner of FIG. 1;

FIG. 4 is a sectional view of the dehorner of FIG. 1 taken along line 4—4 of FIG. 2;

FIG. 5 is a sectional view of the dehorner of FIG. 1 taken along line 5—5 of FIG. 2;

FIG. 6 is a partial top view, partially in section and on an enlarged scale of the blades of the dehorner of FIG. 1 showing the respective cutting edges of the blades in contact with each other, and FIG. 7 is a view corresponding to FIG. 6 but drawn to the scale of FIGS. 1 thru 5 showing in partial section, the base end of an animal horn and adjoining skull section, with the horn inserted between the blades in position for cutting.

DESCRIPTION OF THE PREFERRED EMBODIMENTS

Referring to the drawings, in particular FIGS. 1, 2 and 4 thereof, there is shown a dehorner which includes a frame 10 of a substantially rectangular configuration. As best seen in FIG. 2, frame 10 comprises top and bottom rail members 50 and 51 and left and right frame support members 36 and 44. The rail members are connected to the frame members by bolts 38 and 48. Rail members 50 and 51 of frame 10 each contain respective grooves 52 on the inwardly facing sides thereof, which grooves are configured to receive a fixed blade 12 and a reciprocating blade 22 for mounting therein as described in more detail below. A fixed blade 12 is mounted at the left hand end (as viewed in FIG. 2) of frame 10 and has top and bottom portions 14, said portions having on their upper and lower surfaces, respectively, elongated ribs 70 (best seen in FIG. 5) which are shaped and configured to be received within the respective grooves 52 of top and bottom rails 50 and 51. The base portion 14 of the fixed blade 12 is affixed to frame support member 44 by bolt 46 as shown in FIG. 2.

Frame 10 has a cutting side which defines a plane as shown by line 11 (FIG. 1). A riser portion 16 of fixed blade 12 extends outward from that plane as does a riser portion 26 of reciprocating blade 22. A base portion 24 of reciprocating blade 22 is configured substantially the same as the base portion 14 of the fixed blade 12. The reciprocating blade 22 is attached to a piston rod 34 which connects to piston cylinder 32 which is in turn connected to a source of hydraulic fluid (not shown). The actuating means are operatively connected to the cylinder 32 in the conventional manner to control operation of the device. The piston rod 34 extends through frame support member 36 and is threaded into an attachment plate 40 which is fastened to the base portion 24 of blade 22 by screws 42. The piston cylinder 32 operates to drive the reciprocating blade 22 alternately toward and away from the fixed blade 12 during the dehorning operation.

As shown in FIGS. 1 and 2, portions 16 and 26 of fixed blade 12 and reciprocating blade 22, have beveled surfaces 18 and 28 terminating in cutting edges 20 and 30 respectively. Because of the shapes of the blades as thus described the blade edges will define a cutting path as shown by dotted line 80 in FIG. 7 during dehorning, as opposed to the cutting path of the prior art as shown by dotted line 82. The cutting path 80 is behind the base 76 of horn 72 and into the softer portion 78 of the skull. Horn 72 is inserted into space 74 prior to the cutting operation.

In order to make the dehorning operation more efficient, the distance 31 as shown in FIG. 4, between the plane 11 of the cutting side of the frame and the cutting edges 20 and 30 of the blades should be sufficient to allow the blades 12 and 22 to cooperate to cut behind the horn 72 into the softer portion 78 of the skull, but should not be so great as to cause the blades to pierce the skull. In a preferred embodiment, this distance is between about one quarter of an inch and three quarters of an inch.

Another feature of the invention relates to the shape and juxtaposition of the cutting edges 20 and 30 of the fixed and reciprocating blades respectively. As is more clearly shown in FIG. 6, the cutting edge 20 of fixed blade 12 is somewhat wider than that of cutting edge 30 of reciprocating blade 22. Also, cutting edge 20 is substantially perpendicular to frame 10 while cutting edge 30 includes a beveled portion adjacent the narrow cutting edge which lies parallel to the wider cutting edge 20. The configuration and juxtaposition of the two cutting edges allow cutting edge 20 to act as a stop for cutting edge 30 when reciprocating blade 22 contacts fixed blade 12 during the cutting phase of the dehorning operation.

The actuating means for the hydraulic cylinder 32 includes two finger-actuated trigger switches 62 as shown in FIG. 3. The switches are contained in right hand grip 54 and left hand grip 56 as shown in FIGS. 1 and 2. The hand grips, which are located on the operator side of the device, are attached to frame support members 36 and 44 by grip support members 71 and are used by the operator to guide the tool which is supported overhead by lines (not shown) which are attached to holes 58 in hanger bracket 60 as shown in FIG. 2. The trigger switches 62 are attached to electrical conduits 64 which in turn connect to an electrical control box 66 from which extends an electrical wire 68. Wire 68 is attached to the controls (not shown) of piston 32. The control box 66 is wired so that cylinder 32 will advance the reciprocating blade 22 toward the fixed blade when both triggers 62 are depressed. When either or both of the triggers is released the cylinder 32 retracts the reciprocating blade 22 away from the fixed blade 12. This provides a safety feature in that it reduces the chances of the device being accidentally actuated. In operation both trigger switches 62 are actuated simultaneously causing the hydraulic cylinder 32 to advance the reciprocating blade 22 toward the fixed blade 12. The beveled portion 26 of the reciprocating blade 22 spaces cutting edge 30 away from the plane of frame 10 so that edge 30, in cooperation with edge 20, cuts through the softer portion of the skull 78 until the cutting edge 30 makes contact with cutting edge 20. At that time either or both of trigger switches 62 is released and reciprocating blade 22 returns to the open position, spaced apart from fixed blade 12, so that the operation can be repeated.

The above description sets forth one embodiment of the invention, but many variations are possible and the invention is not limited to the specific details set forth herein, but covers the full range of equivalents which embody the spirit and scope of the invention.

What is claimed is:

1. A dehorner comprising a frame having a cutting side defining a first plane and an opposite, operator side, a pair of opposed blades mounted in the frame and having respective parallel cutting edges, motive means responsive to actuating means to operate at least one of the blades to provide relative straight line movement of the cutting edges between an open position and a closed, cutting position, each blade having a base portion mounted within the frame and a riser portion extending outwardly of the plane of the cutting side of the frame and having a beveled portion terminating in its respective cutting edge, the cutting path defined by movement of the cutting edge of at least one of the blades lying in a second plane spaced from the plane defined by the cutting side of the frame and parallel thereto.

2. The dehorner of claim 1 wherein one of the opposed blades is a fixed blade and the other opposed blade is a reciprocating blade which is operatively connected to the motive means for selective movement, in response to the actuating means, towards the fixed blade to the closed, cutting position and away from the fixed blade to the open position.

3. The dehorner of claim 2 wherein the cutting edge of the fixed blade is of greater width than the cutting edge of the reciprocating blade whereby the cutting edge of the fixed blade serves as a stop for the reciprocating blade.

4. The dehorner of claim 2 wherein the motive means comprises a hydraulic actuated cylinder operatively connected to the reciprocating blade.

5. A dehorner comprising,
   a flat rectangular open frame constituted by vertical end posts and straight horizontal top and bottom rails, said frame defining a plane,
   said rails being provided, respectively, with a downwardly facing upper track and an upwardly facing lower track,
   a pair of opposed blade elements mounted between said tracks and in engagement therewith,
   each blade element having a base portion provided with upper and lower track engaging means lying substantially in the plane of the frame, and each blade having a cutting edge offset from said plane and bounded by a beveled surface extending from said plane substantially to a respective cutting edge, motive means mounted on the frame for driving at least one of the blades toward and away from the other blade, said cutting edges defining a straight line cutting path which is parallel to and spaced from the plane of the frame.

6. A dehorner according to claim 5 wherein one blade element is fixed.

7. A dehorner according to claim 5 wherein the blade edges are substantially straight.

* * * * *